United States Patent Office 3,040,028
Patented June 19, 1962

3,040,028
PROCESS FOR SEPARATING 1-METHYLHOMO-
PIPERAZINE AND HOMOPIPERAZINE
Fédor Poppelsdorf, Charleston, W. Va., assignor to Union
Carbide Corporation, a corporation of New York
No Drawing. Filed Jan. 27, 1960, Ser. No. 4,862
9 Claims. (Cl. 260—239)

This invention relates, in general, to a process for the separation of a heterocyclic nitrogen-containing compound from its corresponding methyl-substituted derivative. In one aspect, this invention relates to a novel process for the separation of 1-methylhomopiperazine and homopiperazine.

Due to the outstanding and desirable physiological characteristics of the derivatives of 1-methylhomopiperazine, this compound is currently of interest as a pharmaceutical intermediate. For example, the works of A. H. Sommers, R. J. Michaels, Jr., and A. W. Weston, J. Am. Chem. Soc., 76, 5805 (1954), J. W. Reinertson and P. E. Thompson, Antibiotics and Chemotherapy, 5, 566 (1955), and P. Brookes, R. J. Terry, and J. Walker, J. Chem. Soc., 3165 (1957) indicate the desirable physiological activities of the derivatives of 1-methylhomopiperazine. These desirable features have stimulated a search for a commercially feasible synthetic route from inexpensive and readily available raw materials.

Heretofore, 1-methylhomopiperazine (III) has been prepared by several known methods. For instance, one such method involves a ring enlargement of the expensive 1-methyl-4-piperidone (I) by a Schmidt-type rearrangement followed by a lithium aluminum hydride reduction of the resulting homopiperazinone (II):

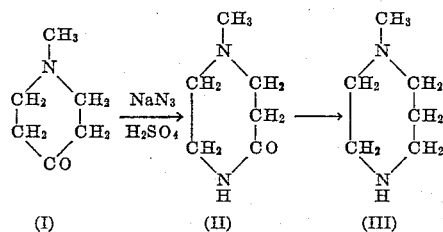

A different procedure employs a catalytic cyclohydration of N(2'-hydroxyethyl)-N-methyl - 1,3 - propanediamine (IV) to form 1-methylhomopiperazine (III) in a yield of approximately 13.3 percent:

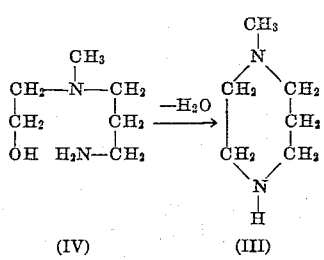

However, each of the aforesaid methods suffers from the disadvantage of mediocre yields or of being based on relatively inaccessible starting materials. For example, the above 1-methyl-4-piperidone (I) is an expensive intermediate requiring at least three steps to prepare, which undoubtedly would be very costly and unsuitable for large scale production.

More recently, a novel process has been discovered for the preparation of 1-methylhomopiperazine. This process involves the reductive methylation of homopiperazine (V) with formaldehyde and hydrogen in the presence of a reductive methylation catalyst:

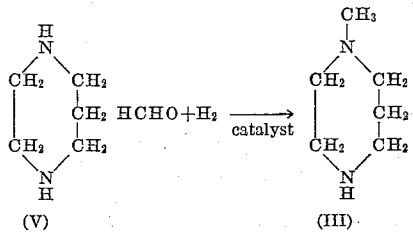

By this novel process, 1-methylhomopiperazine can be obtained in yields as high as 60 percent. However, the aforesaid method is complicated by the presence of the less desirable 1,4-dimethylhomopiperazine and unchanged homopiperazine in the reaction product. Although reaction conditions can be adjusted to favor formation of the monomethylated compound, it is not possible to completely exclude formation of some of the dimethylated product. Isolation of pure 1-methylhomopiperazine therefore involves its separation from 1,4-dimethylhomopiperazine and homopiperazine.

No difficulty is encountered in the removal of the 1,4-dimethylhomopiperazine since it forms a relatively low boiling azeotrope with water and can thus be distilled off at about 97.5° C. at a pressure of 750 millimeters of mercury. However, inasmuch as the boiling points of the 1-methylhomopiperazine and homopiperazine are relatively close, as indicated in Table I:

TABLE I

| Pressure, mm. Hg | Boiling Points, ° C. | |
|---|---|---|
| | Homopiperazine | 1-methyl homopiperazine |
| 760 | 169 | 165 |
| 50 | 92 | 83 |
| 10 | 60 | 50 | separation cannot be effected efficiently by distillation or other practical means. Furthermore, since there are no previously disclosed inexpensive and practical techniques known for the chemical separation of secondary amines of the foregoing structure, isolation of the 1-methylhomopiperazine product presented a serious problem.

Accordingly, one or more of the following objects will be achieved by the practice of the instant invention. It is an object of the present invention to provide a novel process for the separation of 1-methylhomopiperazine from homopiperazine wherein the disadvantages hereinbefore enumerated are substantially eliminated. It is also an object of the present invention to provide a simple and practical procedure for the separation of 1-methylhomopiperazine from homopiperazine; which is economical and affords substantially complete separation. Another object of the present invention is to provide a novel chemical process for the separation of 1-methylhomopiperazine and homopiperazine which can be conducted in a simple step employing readily available and inexpensive materials. A further object is to provide a process for the separation of 1-methylhomopiperazine from homopiperazine employing an aliphatic, aromatic or heterocyclic aldehyde. A still further object of the present invention is to provide a process for the separation of 1-methylhomopiperazine from homopiperazine employing aromatic aldehyde, benzaldehyde being particularly preferred. These and other objects will readily become apparent to those skilled in the art in the light of the teachings herein set forth.

A broad aspect of this invention is directed to a process for the separation of 1-methylhomopiperazine from a mixture containing 1-methylhomopiperazine and homopiperazine which comprises adding to the mixture an aliphatic, aromatic or heterocyclic aldehyde wherein the aldehyde reacts preferentially with homopiperazine to form an 8-substituted-1,5-diazabicyclo(3.2.1)octane having a boiling point substantially higher than the 1-methylhomopiperazine, and thereafter separating the 1-methylhomopiperazine by distillation. The aforementioned process represents a novel method for the separation of 1-methylhomopiperazine from mixtures containing homopiperazine.

This invention is therefore based, in part, on the discovery that aldehydes will combine preferentially and almost exclusively with homopiperazine in a mixture containing 1-methylhomopiperazine and homopiperazine to form stable bicyclic compounds having boiling points substantially higher than the 1-methyl derivative. The following equation illustrates the reaction of an aldehyde and homopiperazine to form an 8-substituted-1,5-diazabicyclo(3.2.1)octane:

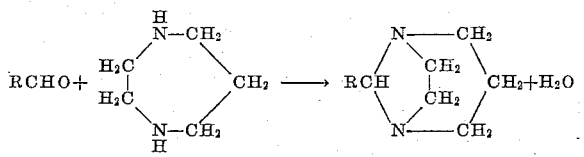

wherein R represents a member selected from the group consisting of saturated aliphatic, aromatic and heterocyclic groups containing not more than 18 carbon atoms. Inasmuch as the bicyclic compound will have a boiling point substantially higher than the 1-methylhomopiperazine separation can be effected efficiently by distillation and the homopiperazine products recovered in a high degree of purity. The preferential combination of aldehydes and homopiperazine to form stable bicyclic compounds was indeed unexpected and surprising, particularly in the case of the aromatic aldehydes which have been stated not to combine with secondary amines. Homopiperazine, of course, is a secondary amine.

A further advantage of the present invention is that the bicyclic compound remaining after removal of the 1-methylhomopiperazine can be hydrolyzed with dilute aqueous mineral acid to the original aldehyde and homopiperazine, both of which can then be recovered. For example, the aldehyde can first be recovered almost quantitatively by some suitable method such as steam distillation of the hydrolysis product and the liberated homopiperazine then recovered by distillation or extraction with a solvent after basification of the residual acid solution.

In a preferred embodiment of the present invention one mole of a suitable aldehyde such as benzaldehyde, was gradually added with stirring to a mixture containing 1-methylhomopiperazine and not more than one mole of homopiperazine whereupon an exothermic reaction occurred. The mixture was thereafter stirred for about 30 minutes after the addition of aldehyde had been completed and then distilled through a column having an efficiency of about 10 theoretical plates. It was preferred to conduct the distillation at a reduced pressure since kettle temperatures in excess of 180° C. can lead to decomposition of the residue with possible contamination of the distillate. After removal of a first fraction, which consisted principally of water, the distillate contained over 90 percent of the 1-methylhomopiperazine originally present in the mixture. Analysis showed that the recovered product had a purity in excess of 98 percent. The kettle residue was refluxed for 2.25 hours with 2.2 moles of dilute aqueous hydrochloric acid for each mole of homopiperazine originally present in the mixture. Benzaldehyde, which separated as a dark-brown upper layer, was steam distilled and was recovered in an amount representing 90 percent of the original quantity employed. The residue was made alkaline with a sodium hydroxide solution and was distilled to recover the homopiperazine. Thus, by operating according to the process of the present invention a substantially complete separation of 1-methylhomopiperazine and homopiperazine is obtained in addition to recovery of the aldehyde.

The advantages obtained by employing the novel separation process of the present invention using benzaldehyde over fractional distillation of the mixture in the absence of aldehyde treatment, will be more apparent from a comparison of the percentages of 1-methylhomopiperazine recovered and the purity of the product as noted in Table II:

TABLE II

|  | Aldehyde Method | Distillation Method |
|---|---|---|
| Percent 1-methylhomopiperazine recovered | 92.7 | 79 |
| Purity of 1-methylhomopiperazine recovered | 100 | 88.2 |

Suitable aldehyde for use in the process of the present invention include, among others, the aliphatic, aromatic and heterocyclic aldehydes. Preferred aldehydes include those containing from 2 to about 18 carbon atoms, more preferably from 2 to about 12 carbon atoms, and still more preferably from 2 to about 8 carbon atoms, either as a straight chain, branched chain or part of a homocyclic or heterocyclic ring system. Particularly preferred aldehydes are the alkyl, aryl, alkaryl, aralkyl, cycloalkyl, bicycloalkyl, bicycloakylalkyl, aldehydes containing from 2 to about 12 carbon atoms. Examples of suitable aldehydes include, among others, the following:

| | |
|---|---|
| acetaldehyde | benzaldehyde |
| propionaldehyde | 1-naphthaldehyde |
| butyraldehyde | salicylaldehyde |
| pentanal | furfural |
| hexanal | 2-indolealdehyde |
| 2-ethylhexaldehyde | 3-indolealdehyde |
| stearaldehyde | 2-thiophenealdehyde |
| cyclohexanecarboxaldehyde | 3-thiophenealdehyde |
| bicyclo(2.2.1)heptanecarboxaldehyde | phenylacetaldehyde |
| | phenylpropionaldehyde |

The preferred aldehydes include: acetaldehyde, propionaldehyde, n-butyraldehyde, 2-ethylhexaldehyde, benzaldehyde, p-methoxybenzaldehyde, salicylaldehyde, furfural, and the like. A particularly preferred aldehyde is benzaldehyde which was the most efficient and economically attractive. Other aldehydes, containing from 2 to 18 carbon atoms are also applicable for use in the practice of this invention. Although the preferred aldehydes contain no elements other than carbon, hydrogen, oxygen, they may also contain other substituents such as nitro, dialkylamino, alkylthio, and the like. Similarly, aldehydes containing chlorine substituted on an aromatic nucleus can also be employed. The only requirement being that such elements do not react adversely with the homopiperazine or prevent the combination of the aldehyde and homopiperazine.

The mole ratio of aldehyde to homopiperazine is not narrowly critical and can vary over wide limits. In practice, all that is needed is an amount of aldehyde at least stoichiometrically equal to the amount of homopiperazine present in the mixture. For large scale operation it has been found desirable to first analyze the mixture to be separated for total alkalinity and tertiary amine content. Thereafter the amount of homopiperazine in the mixture is calculated from the results of the analyses and an equimolar quantity of the aldehyde is added.

Inasmuch as the interaction of the aldehyde with the homopiperazine causes the formation of an equimolar quantity of water, the use of a drying agent, such as anhydrous magnesium sulfate, or azeotropic drying may be desirable, though not absolutely necessary. Likewise a solvent can be employed as the reaction media provided it is essentially chemically inert towards the reactants and products.

Reaction temperatures are not necessarily critical and can range from about −20° to about 200° C. A particularly preferred temperature range is from about 20° to about 120° C. As previously indicated, temperatures in excess of 180° C. are less preferred due to the possible decomposition of the residue product with subsequent contamination of the distillate. In view of this, it may be desirable, although not necessary, to control the exothermic reaction by cooling the reaction kettle so as to maintain the temperature within specified limits. Since the reaction between aldehydes and homopiperazine is rather rapid, the amount of heat evolved declines soon after the addition of aldehyde is complete. It is thus possible to control the reaction temperature by the rate of addition of the aldehyde. For instance, when one mole of aldehyde was added with stirring over a five minute period to a mixture of one mole of 1-methylhomopiperazine and one mole of homopiperazine at room temperature (25° C.), the reaction temperature usually rose to slightly over 100° C. and then immediately began to decline. Although the reaction is essentially complete upon addition of all the aldehyde, in practice, it was found desirable to continue to stir the mixture for approximately 30 minutes or longer.

Upon completion of the reaction, the 1-methylhomopiperazine can be recovered in a high state of purity by fractional distillation. 1-methylhomopiperazine distills at temperatures of from about 50° to about 165° C. at corresponding pressures of from about 10 to 760 millimeters of mercury as indicated in Table I. Kettle temperatures in excess of about 180° C. should be avoided.

Since no special processing equipment or apparatus is required for the novel separation procedure of the present invention, its simplicity and efficiency are most desirable features. Additionally, the novel separation process of the present invention is applicable for mixtures of 1-methylhomopiperazine and homopiperazine in all proportions.

The following examples are illustrative:

*Example I*

106.1 grams of benzaldehyde (1 mole) were added with stirring over a period of five minutes to a mixture of 114.2 grams of 1-methylhomopiperazine (1 mole) and 100.2 grams of homopiperazine (1 mole). An exothermic reaction took place whereby the temperature of the mixture rose to 97° C. After all the aldehyde had been introduced the mixture was stirred for 30 minutes and then distilled under reduced pressure through a fractionating column having an efficiency of about 10 theoretical plates. The fraction having a boiling point of from 60.5° to 62.5° at a pressure of 20 millimeters of mercury, had a Refractive Index, $n_D^{20}$, of 1.4770, and was substantially pure 1-methylhomopiperazine (105.8 grams).

186 cubic centimeters of an aqueous 37 percent hydrochloric acid solution and 150 cubic centimeters of water were added with cooling to the residue remaining after removal of the 1-methylhomopiperazine. This mixture was refluxed with stirring for 2 hours and 15 minutes and thereafter steam distilled. 93.9 grams of benzaldehyde were recovered from the steam distillate. The acid solution remaining was made alkaline with 176 grams (2.2 moles) of a 50 percent aqueous sodium hydroxide solution and then distilled with stirring at reduced pressure. After the bulk of the water had been removed 200 grams of high-boiling mineral oil were added to the product and the distillation continued. The fraction having a boiling point of from 87° to 92° C. at a pressure of 50 millimeters of mercury consisted of 58.1 grams of homopiperazine.

*Example II*

136.1 grams of p-methoxybenzaldehyde (1 mole) were added with stirring over a period of three minutes to a mixture of 114.2 grams of 1-methylhomopiperazine (1 mole) and 100.2 grams of homopiperazine (1 mole). An exothermic reaction took place whereby the temperature of the reaction mixture rose to a maximum of 83° C. After all the aldehyde had been introduced the mixture was stirred for 30 minutes and then distilled under reduced pressure through a fractionating column having an efficiency of about 10 theoretical plates. The fraction having a boiling point of from 60.5° to 62.5° C. at a pressure of 20 millimeters of mercury, had a Refractive Index, $n_D^{20}$, of 1.4776, and was substantially pure 1-methylhomopiperazine (104.2 grams).

*Example III*

72.1 grams of n-butyraldehyde (1 mole) were added with stirring over a period of three minutes to a mixture of 114.2 grams of 1-methylhomopiperazine (1 mole) and 100.2 grams of homopiperazine (1 mole). An exothermic reaction occurred whereby the temperature of the reaction mixture rose to a maximum of about 112° C. After all the aldehyde had been introduced the mixture was stirred for one hour and then distilled under reduced pressure through a fractionating column having an efficiency of about 10 theoretical plates. The fraction having a boiling point of from 81° to 82° C. at a pressure of 50 millimeters of mercury, had a Refractive Index, $n_D^{20}$, of 1.4782, and was substantially pure 1-methylhomopiperazine (92.3 grams).

*Example IV*

128.2 grams of 2-ethylhexaldehyde (1 mole) were added with stirring over a period of three minutes to a mixture of 114.2 grams of 1-methylhomopiperazine (1 mole) and 100.2 grams of homopiperazine (1 mole). An exothermic reaction occurred whereby the temperature of the reaction mixture rose to a maximum of about 102° C. After all the aldehyde had been introduced the mixture was stirred for 30 minutes and then distilled under reduced pressure through a fractionating column having an efficiency of about 10 theoretical plates. The fraction having a boiling point of from 81° to 82° C. at a pressure of 50 millimeters of mercury, had a Refractive Index, $n_D^{20}$, of 1.4777 and was substantially pure 1-methylhomopiperazine (84.3 grams).

*Example V*

96.1 grams of furfural (1 mole) were added with stirring over a period of seven minutes to a mixture of 114.2 grams of 1-methylhomopiperazine (1 mole) and 100.2 grams of homopiperazine (1 mole). An exothermic reaction occurred whereby the temperature of the reaction mixture rose to a maximum of about 99° C. After all the aldehyde had been introduced the mixture was stirred for 40 minutes and then distilled under reduced pressure through a fractionating column having an efficiency of about 10 theoretical plates. The fraction having a boiling point of from 60.5° to 62.5° C. at a pressure of 20 millimeters of mercury, had a Refractive Index, $n_D^{20}$, of 1.4782, and was substantially pure 1-methylhomopiperazine (72.0 grams).

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for the separation of 1-methylhomopiperazine from a mixture containing 1-methylhomopiperazine and homopiperazine which comprises adding to said mixture a compound which is a member selected from the group consisting of unsubstituted saturated aliphatic aldehydes of from 2 to 18 carbon atoms, unsubstituted aromatic aldehydes of from 7 to 18 carbon atoms, and unsubstituted heterocyclic aldehydes of from 5 to 18 carbon atoms, to form with said homopiperazine an 8-substituted-1,5-diazabicyclo(3.2.1)octane having a boiling point substantially higher than said 1-methylhomopiperazine; separating said 1-methylhomopiperazine by distillation and thereafter recovering said aldehyde and homopiperazine by acid hydrolysis of said 8-substituted-1,5-diazabicyclo(3.2.1)octane.

2. A process for the separation of 1-methylhomopiperazine from a mixture containing 1-methylhomopiperazine and homopiperazine which comprises adding to said mixture an unsubstituted saturated aliphatic aldehyde of from 2 to about 18 carbon atoms to form with said homopiperazine an 8-substituted-1,5-diazabicyclo(3.2.1)-octane having a boiling point substantially higher than said 1-methylhomopiperazine; separating said 1-methylhomopiperazine by distillation and thereafter recovering said aldehyde and homopiperazine by acid hydrolysis of said 8-substituted-1,5-diazabicyclo(3.2.1)octane.

3. A process for the separation of 1-methylhomopiperazine from a mixture containing 1-methylhomopiperazine and homopiperazine which comprises adding to said mixture an unsubstituted aromatic aldehyde of from 7 to about 18 carbon atoms to form with said homopiperazine an 8-substituted-1,5-diazabicyclo(3.2.1)octane having a boiling point substantially higher than said 1-methylhomopiperazine; separating said 1-methylhomopiperazine by distillation and thereafter recovering said aldehyde and homopiperazine by acid hydrolysis of said 8-substituted-1,5-diazabicyclo(3.2.1)octane.

4. A process for the separation of 1-methylhomopiperazine from a mixture containing 1-methylhomopiperazine and homopiperazine which comprises adding to said mixture an unsubstituted heterocyclic aldehyde of from 5 to about 18 carbon atoms to form with said homopiperazine an 8-substituted-1,5-diazabicyclo(3.2.1)octane having a boiling point substantially higher than said 1-methylhomopiperazine; separating said 1-methylhomopiperazine by distillation and thereafter recover said aldehyde and homopiperazine by acid hydrolysis of said 8-substituted-1,5-diazabicyclo(3.2.1)octane.

5. A process as claimed in claim 2 wherein said aldehyde is n-butyraldehyde.

6. A process as claimed in claim 2 wherein said aldehyde is 2-ethylhexaldehyde.

7. A process as claimed in claim 3 wherein said aldehyde is benzaldehyde.

8. A process as claimed in claim 3 wherein said aldehyde is p-methoxybenzaldehyde.

9. A process as claimed in claim 4 wherein said aldehyde is furfural.

No references cited.